United States Patent
Hamada et al.

(10) Patent No.: US 11,708,622 B2
(45) Date of Patent: Jul. 25, 2023

(54) BOLT AND FASTENED STRUCTURE

(71) Applicant: NISSAN MOTOR CO., LTD., Yokohama (JP)

(72) Inventors: Takahiro Hamada, Kanagawa (JP); Daisuke Kobayashi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 272 days.

(21) Appl. No.: 16/965,652

(22) PCT Filed: Jan. 30, 2018

(86) PCT No.: PCT/JP2018/002991
§ 371 (c)(1),
(2) Date: Jul. 29, 2020

(87) PCT Pub. No.: WO2019/150437
PCT Pub. Date: Aug. 8, 2019

(65) Prior Publication Data
US 2021/0017618 A1    Jan. 21, 2021

(51) Int. Cl.
*C21D 6/00* (2006.01)
*C21D 8/00* (2006.01)
(Continued)

(52) U.S. Cl.
CPC ........... *C21D 9/0093* (2013.01); *C21D 6/002* (2013.01); *C21D 6/005* (2013.01); *C21D 6/008* (2013.01);
(Continued)

(58) Field of Classification Search
CPC ........ C21D 9/0093; C21D 9/525; C21D 9/54; C21D 6/002; C21D 6/005; C21D 6/008;
(Continued)

(56) References Cited

U.S. PATENT DOCUMENTS

2011/0048613 A1    3/2011    Iwata et al.
2012/0241081 A1    9/2012    Iwata et al.
(Continued)

FOREIGN PATENT DOCUMENTS

JP    2011-046010 A    3/2011
JP    2011-047010 A    3/2011
(Continued)

*Primary Examiner* — Humera N. Sheikh
*Assistant Examiner* — Kevin C T Li
(74) *Attorney, Agent, or Firm* — Foley & Lardner LLP

(57) ABSTRACT

A bolt of the present invention has a composition comprising: 0.50 mass % or greater and 0.65 mass % or less of carbon (C), 1.5 mass % or greater and 2.5 mass % or less of silicon (Si), 1.0 mass % or greater and 2.0 mass % or less of chromium (Cr), 0.2 mass % or greater and 1.0 mass % or less of manganese (Mn), 1.5 mass % or greater and 5.0 mass % or less of molybdenum (Mo), wherein a total amount of phosphorous (P) and sulfur (S) as impurities is 0.03 mass % or less, the remaining is iron (Fe), and the bolt comprises an iron based oxide film with a film thickness of 3 μm or greater and 20 μm or less on the surface thereof. The bolt has excellent delayed fracture resistance and reliably provides a fastening axial force.

3 Claims, 1 Drawing Sheet

(51) Int. Cl.
*C21D 9/00* (2006.01)
*C22C 38/00* (2006.01)
*C22C 38/02* (2006.01)
*C22C 38/04* (2006.01)
*C22C 38/22* (2006.01)
*F16B 33/00* (2006.01)

(52) U.S. Cl.
CPC ............ *C21D 8/005* (2013.01); *C22C 38/002* (2013.01); *C22C 38/02* (2013.01); *C22C 38/04* (2013.01); *C22C 38/22* (2013.01); *F16B 33/00* (2013.01)

(58) Field of Classification Search
CPC .... C21D 1/25; C21D 1/76; C21D 3/04; C22C 38/002; C22C 38/02; C22C 38/04; C22C 38/22; C22C 38/34; C22C 8/02; C22C 8/10; C22C 8/12; C22C 8/14; C22C 28/04; C22C 28/042; F16B 33/00; F16B 33/06

See application file for complete search history.

(56) References Cited

U.S. PATENT DOCUMENTS

2015/0003935 A1* 1/2015 Matsumoto ............... C23C 8/14
148/287
2017/0283921 A1 10/2017 Hamada et al.

FOREIGN PATENT DOCUMENTS

| WO | WO 2016/031528 A1 | 3/2016 | |
| WO | WO-2016031528 A1 * | 3/2016 | ............ C21D 6/002 |
| WO | WO-2017043034 A1 * | 3/2017 | ............... C23C 8/10 |

* cited by examiner

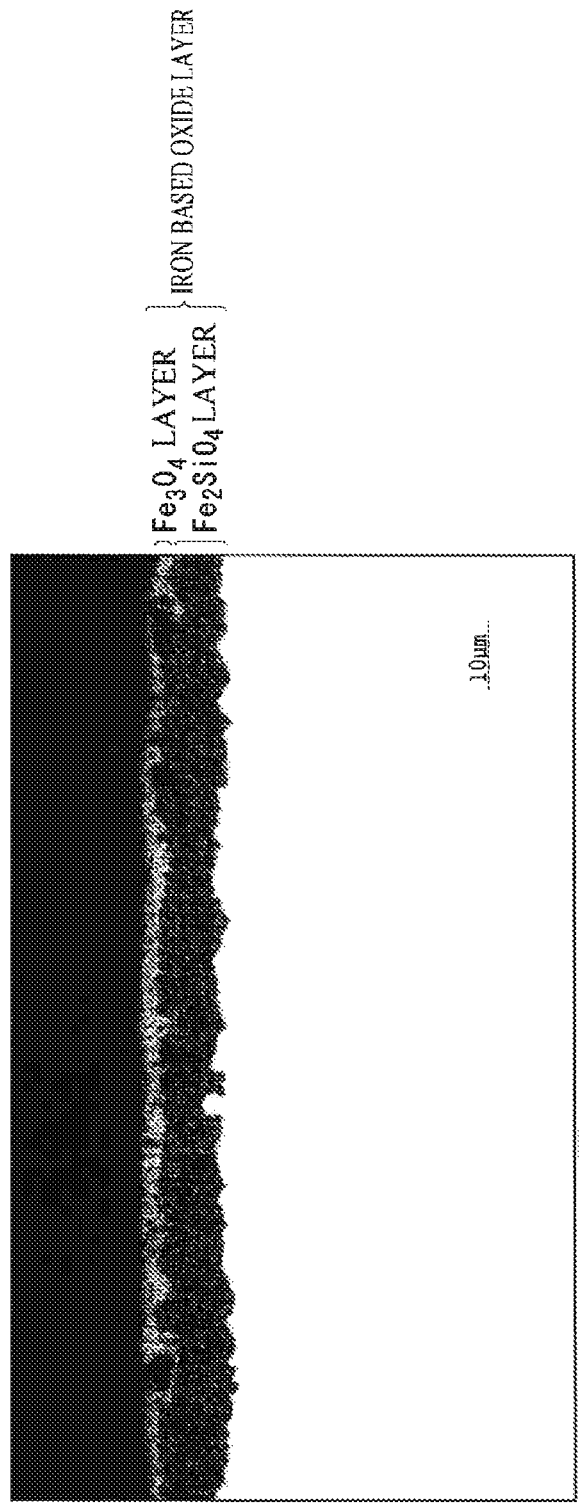

BOLT AND FASTENED STRUCTURE

TECHNICAL FIELD

The present invention relates to a bolt, and more specifically relates to a high-strength bolt whose fastening axial force is readily managed.

BACKGROUND ART

It is desired to raise the strength of bolts in order to achieve light weight, small dimensions, and high performances of automobiles. In these circumstances, high-carbon steel bolts having a tensile strength exceeding 1200 MPa are known.

However, high-carbon steel bolts having high strength are remarkably prone to cause sudden brittle fracture under static stresses after a certain time has elapsed, which is generally called "delayed fracture". The risk of occurrence of the delayed fracture increases as strength of the bolt increases.

The delayed fracture is a kind of environmental embrittlement that occurs by mutual interaction among material, environment, and stress. It is considered that the delayed fracture is due to embrittlement of material caused by hydrogen. In general, in order to improve delayed fracture resistance, a surface treatment such as chromium plating is performed.

Patent Document 1 discloses a high-strength bolt that uses high-carbon steel having a predetermined composition containing silicon, whereby delayed fracture is suppressed. It is also disclosed that the bolt is preferably coated with a chromium plating film or an iron phosphate film.

CITATION LIST

Patent Document

Patent Document 1: WO 2016/031528

SUMMARY OF INVENTION

Technical Problem

High-strength bolts provide large fastening axial forces, and therefore, it is important to manage the fastening axial force in order not to break the bolt and not to make a hollow in a bearing surface. In general, the fastening axial force is secured by using a torque wrench so as to manage tightening torque.

However, tightening torque does not entirely act as a fastening axial force, but is consumed by friction at a thread surface and a bearing surface, and thus, although a bolt is tightened with fixed torque, a fastening axial force varies depending on surface roughness of the bolt and a lubrication state.

That is, although tightening torque is the same, a fastening axial force is small due to occurrence of large friction loss when friction between a bolt and a fastened object is large, and, conversely, the fastening axial force is large when the friction is small.

In particular, high-carbon steel bolts containing silicon have excellent tensile strength and delayed fracture resistance, but provide a fastening axial force that greatly varies with respect to tightening torque, Thus, it is difficult to manage the fastening axial force of the high-carbon steel bolts.

A surface treatment such as a phosphoric acid film may be performed to a high-carbon steel bolt in order to prevent galling with a mating member and to stabilize fastening properties. This allows hydrogen to invade, thereby making delayed fracture readily occur, and moreover, this roughens a surface, thereby decreasing fatigue strength.

The present invention has been made in view of these problems in the prior art, and an object thereof is to provide a high-strength bolt having excellent delayed fracture resistance and reliably providing a fastening axial force.

Solution to Problem

The inventors of the present invention have made an intensive research to achieve the above object and have found the following findings. That is, a high-carbon steel bolt containing silicon has low affinity with a surface treatment material, and therefore, defects are generated on a surface film due to high tightening torque, whereby a friction coefficient of the bolt is changed and variation of a fastening axial force is generated.

The inventors of the present invention have also found that the above object can be achieved by forming an iron based oxide film with a film thickness of 3 μm or greater and 20 μm or less on a surface, instead of a surface treatment such as plating or a phosphoric acid based film treatment. Thus, the present invention has been completed.

Specifically, the bolt of the present invention has a composition comprising: 0.50 mass % or greater and 0.65 mass % or less of carbon (C),
1.5 mass % or greater and 2.5 mass % or less of silicon (Si),
1.0 mass % or greater and 2.0 mass % or less of chromium (Cr),
0.2 mass % or greater and 1.0 mass % or less of manganese (Mn),
1.5 mass % or greater and 5.0 mass % or less of molybdenum (Mo);
in which a total amount of phosphorous (P) and sulfur (S) as impurities is 0.03 mass % or less; and the remaining is iron (Fe).
The bolt includes an iron based oxide film with a film thickness of 3 μm or greater and 20 μm or less on a surface thereof.

The present invention also provides a fastened structure in which a fastened member is fastened with the bolt described above.

Advantageous Effects of Invention

In the present invention, an iron based oxide film with a film thickness of 3 μm or greater and 20 μm or less is provided on a surface of a high-strength bolt. Thus, the present invention provides a high-strength bolt having excellent delayed fracture resistance and reliably providing a fastening axial force.

BRIEF DESCRIPTION OF DRAWINGS

FIG. 1 is a cross-sectional image of a bolt of an example.

DESCRIPTION OF EMBODIMENTS

A bolt of the present invention will be described in detail.
The bolt has a composition comprising 0.50 mass % or greater and 0.65 mass % or less of carbon (C), 1.5 mass % or greater and 2.5 mass % or less of silicon (Si), 1.0 mass % or greater and 2.0 mass % or less of chromium (Cr), 0.2 mass % or greater and 1.0 mass % or less of manganese (Mn), 1.5 mass % or greater and 5.0 mass % or less of molybdenum (Mo), 0.03 mass % or less of a total amount of phosphorous (P) and sulfur (S) as impurities; and the remaining is iron (Fe). The bolt includes an iron based oxide film with a film thickness of 3 µm or greater and 20 µm or less on a surface thereof.

The iron based oxide film is an oxide film formed by reaction of the bolt itself by performing a predetermined heat treatment on the bolt that is rolled. The iron based oxide film is not a film, such as a plated film, which is formed by coating a surface of a bolt with other material, e.g. a surface treatment material. For these reasons, film defects, such as peeling off, unlikely occur.

As a result, a friction coefficient of the bolt does not change, whereby variation of a fastening axial force with respect to tightening torque can be suppressed.

The film thickness of the iron based oxide film is 3 µm or greater and 20 µm or less. If the film thickness of the iron based oxide film is less than 3 µm, the iron based oxide film is thin and film defects are easily caused due to tightening torque.

On the other hand, in order to form an iron based oxide film with a thickness exceeding 20 µm, tempering at a high temperature is necessary, which decreases tensile strength of a bolt. In addition, when the film thickness of an oxide film is large, strength of the oxide film itself decreases, and the oxide film easily comes off in tightening.

The iron based oxide film preferably contains a Si based oxide.

The Si based oxide originates from silicon that diffuses from the bolt into the iron based oxide film. The iron based oxide film containing the Si based oxide is prevented from coming off in tightening.

The iron based oxide film preferably contains at least $Fe_3O_4$ and $Fe_2SiO_4$. The iron based oxide film containing $Fe_3O_4$ has decreased friction with a mating member and thereby provides a large fastening axial force for tightening torque. The iron based oxide film containing $Fe_2SiO_4$ has an improved affinity with a bolt base material and is thus prevented from coming off, whereby variation of a fastening axial force with respect to tightening torque can be suppressed.

It is preferable that the iron based oxide film contains $Fe_3O_4$ in a greater amount on a surface side of a bolt than on a bolt base material side of the bolt and contains $Fe_2SiO_4$ in a greater amount on the bolt base material side of the bolt than on the surface side of the bolt.

This iron based oxide film has a layer containing $Fe_2SiO_4$ as a main component on the bolt base material side of the bolt and has a layer containing $Fe_3O_4$ as a main component on the surface side of the bolt. This structure improves affinity with the bolt base material and further improves lubricating properties with respect to a mating member. The term "main component" in the present invention means a component that is contained in an amount of 50 mass % or greater.

The layer containing $Fe_2SiO_4$ as the main component and the layer containing $Fe_3O_4$ as the main component result from the difference in diffusion speed among iron, oxygen, and silicon in a predetermined heat treatment.

The bolt preferably has a tensile strength of 1500 MPa or greater and 1800 MPa or less.

When the tensile strength is within the above described range, it is possible to fasten with a large fastening axial force. In one example, the bolt can be suitably used in a lower link of a reciprocating engine with a double-link mechanism.

In a fastened structure in which a fastened member is fastened with the bolt, which has the iron based oxide film on the surface, the iron based oxide film and the fastened member are in direct contact with each other.

Thus, friction between the bolt and the mating member is reduced, whereby galling is prevented. Moreover, defects of the iron based oxide film due to tightening is prevented from being generated, whereby variation of a fastening axial force can be suppressed.

The content of carbon (C) is 0.50 mass % or greater and 0.65 mass % or less. When the content of carbon is less than 0.50 mass %, sufficient tempering softening resistance is not obtained, and softening is caused by tempering. As a result, tempering at a high temperature cannot be performed, whereby delayed fracture resistance decreases.

On the other hand, when the content of carbon is greater than 0.65 mass %, the amount of cementite that stores hydrogen remarkably increases, whereby excellent delayed fracture resistance is not obtained.

The content of silicon (Si) is 1.5 mass % or greater and 2.5 mass % or less. When the content of silicon is less than 1.5 mass %, tensile strength decreases, and sufficient tempering softening resistance is not obtained. As a result, tempering at a high temperature cannot be performed, whereby delayed fracture resistance decreases. When the content of silicon is greater than 2.5 mass %, forgeability is remarkably degraded, whereby it is difficult to form a bolt into a predetermined shape.

The content of chromium (Cr) is 1.0 mass % or greater and 2.0 mass % or less. When the content of chromium is less than 1.0 mass %, sufficient tempering softening resistance is not obtained. As a result, tempering at a high temperature cannot be performed, whereby delayed fracture resistance decreases.

On the other hand, when the content of chromium is greater than 2.0 mass %, cold forgeability of a steel material decreases.

The content of manganese (Mn) is 0.2 mass % or greater and 1.0 mass % or less. Manganese is a hardenability improving element, and when manganese is contained in the amount of 0.2 mass % or greater, tensile strength is improved.

On the other hand, when the content of manganese is greater than 1.0 mass %, segregation at a grain boundary is facilitated, whereby grain boundary strength decreases and delayed fracture resistance decreases.

The content of molybdenum (Mo) is 1.5 mass % or greater and 5.0 mass % or less.

When the content of molybdenum is less than 1.5 mass %, the amounts of generation of molybdenum based carbides that function as trap sites of hydrogen are not sufficient, whereby hydrogen embrittlement cannot be suppressed, and delayed fracture resistance decreases.

Molybdenum is an element effective for improving hardenability for obtaining a martensitic structure and effective for increasing softening resistance and obtaining high strength in a tempering treatment. However, addition of molybdenum in an amount of greater than 5.0 mass % does not provide further effects.

The total content of phosphorous and sulfur is 0.03 mass % or less and is more preferably 0.02 mass % or less.

When the total content of phosphorous and sulfur is greater than 0.03 mass %, grain boundary segregation is facilitated. As a result, bonding strength of grain boundary decreases, and grain boundary strength decreases, whereby delayed fracture resistance decreases.

Next, a method for producing the bolt will be described.

The bolt of the present invention is produced as follows: a workpiece is heated to 900 to 950° C. and is hardened by rapid cooling, and the workpiece is then tempered in a temperature range of 580 to 620 for 90 to 120 minutes in an atmosphere adjusted in a way as to contain oxygen at a concentration lower than the concentration of oxygen in the air (20.95%) in accordance with a screw diameter of the bolt. The tempering is preferably performed in an atmosphere containing oxygen of, more preferably, 10% or less, or further preferably, 5% or less, with respect to the oxygen concentration.

Tempering in the atmospheric air does not provide a uniform iron based oxide film, because the film thickness of the iron based oxide film becomes too large, when the tempering is performed in the temperature range described above. In addition, tempering at a high temperature decreases tensile strength, and tempering at a low temperature decreases toughness, thereby causing decrease in fatigue strength.

EXAMPLES

The present invention will be detailed with reference to examples hereinafter, but the present invention is not limited to the examples described below.

High-strength bolts were obtained as follows: carbon steels for high-strength bolt having the compositions shown in the following Table 1 were subjected to cold forging and thread rolling and were then hardened at 900° C. or higher, and the carbon steels were then tempered in the conditions shown in the following Table 2 and in an atmosphere containing $N_2$ that was introduced so that an oxygen concentration would be 3%.

Comparative Examples 2, 3, 6, and 8 were tempered in the atmospheric air without introducing $N_2$.

TABLE 2

|  | Tempering Temperature (° C.) | Tempering Time (min) | Tempering Atmosphere |
| --- | --- | --- | --- |
| Example 1 | 580 | 100 | $N_2$ + Atmospheric Air |
| Example 2 | 590 | 100 | $N_2$ + Atmospheric Air |
| Example 3 | 620 | 100 | $N_2$ + Atmospheric Air |
| Comparative Example 1 | 570 | 100 | $N_2$ + Atmospheric Air |
| Comparative Example 2 | 600 | 60 | Atmospheric Air |
| Comparative Example 3 | 600 | 60 | Atmospheric Air |
| Comparative Example 4 | 580 | 100 | $N_2$ + Atmospheric Air |
| Comparative Example 5 | 580 | 100 | $N_2$ + Atmospheric Air |
| Comparative Example 6 | 600 | 60 | Atmospheric Air |
| Comparative Example 7 | 650 | 60 | $N_2$ + Atmospheric Air |
| Comparative Example 8 | 590 | 100 | Atmospheric Air |

In the Comparative Example 2 in Table 2, an oxide scale that was generated by the heat treatment was peeled off.

A manganese phosphate film was formed on an iron based oxide film of the Comparative Example 4. A zinc phosphate film was formed on an iron based oxide film of the Comparative Example 5.

The Comparative Example 6 was subjected to the heat treatment shown in Table 2 after chromium plating was formed thereon.

Cross-sectional surfaces of the high-strength bolts of the Examples 1 to 3 and the Comparative Examples 1 to 8 were photographed, and film thicknesses of iron based oxide films were measured. A total film thickness of the iron based oxide film and the phosphoric acid based film was measured in the Comparative Examples 4 and 5, and a film thickness of the chromium plating was measured in the Comparative Example 6. A cross-sectional surface of the bolt of the Example 2 is illustrated in FIG. 1. Moreover, constituent elements of the iron based oxide film was analyzed by electron probe micro analyzer (EPMA).

TABLE 1

|  | C (mass %) | Si (mass %) | Cr (mass %) | Mn (mass %) | Mo (mass %) | S + P (mass %) | Fe (mass %) |
| --- | --- | --- | --- | --- | --- | --- | --- |
| Example 1 | 0.59 | 1.80 | 1.20 | 0.30 | 1.60 | 0.010 | Rem. |
| Example 2 | 0.60 | 1.85 | 1.20 | 0.30 | 1.60 | 0.015 | Rem. |
| Example 3 | 0.58 | 1.80 | 1.20 | 0.30 | 1.60 | 0.013 | Rem. |
| Comparative Example 1 | 0.58 | 1.80 | 1.20 | 0.30 | 1.60 | 0.013 | Rem. |
| Comparative Example 2 | 0.58 | 1.80 | 1.20 | 0.30 | 1.60 | 0.013 | Rem. |
| Comparative Example 3 | 0.40 | 0.30 | 1.20 | 0.30 | 1.25 | 0.010 | Rem. |
| Comparative Example 4 | 0.59 | 1.80 | 1.20 | 0.30 | 1.60 | 0.010 | Rem. |
| Comparative Example 5 | 0.59 | 1.80 | 1.20 | 0.30 | 1.60 | 0.010 | Rem. |
| Comparative Example 6 | 0.59 | 1.80 | 1.20 | 0.30 | 1.60 | 0.010 | Rem. |
| Comparative Example 7 | 0.59 | 1.80 | 1.10 | 0.33 | 1.65 | 0.015 | Rem. |
| Comparative Example 8 | 0.58 | 1.80 | 1.20 | 0.30 | 1.60 | 0.013 | Rem. |

"Rem." means "Remaining part".

Furthermore, the high-strength bolts of the Examples 1 to 3 and the Comparative Examples 1 to 8 were evaluated in the following conditions. The evaluation results are shown in Table 3.

<Fatigue Test>

Fatigue strengths of the bolts of the Examples 1 to 3 and the Comparative Examples 1 to 8 were measured by a fatigue test using bolts having same dimensions as a product (based on JISB1081). These bolts were mounted to an axial direction fatigue test machine and were repeatedly applied with a tensile load at a room temperature (25° C.) in the air atmosphere. Tensile fatigue strength (MPa) was measured by a staircase method, and a safety factor relative to necessary fatigue strength was calculated.

◯: Safety factor is 1.1 or greater
X: Safety factor is less than 1.1

<Fastening Property Test>

Fastening reliability was evaluated based on occurrence of galling noise at the time of fastening a fastened object with the bolt of Examples 1 to 3 and the Comparative Examples 1 to 8 by a specified tightening torque.

◯: No galling noise occurred
X: Galling noise occurred

TABLE 3

| | Iron Based Oxide Film | Film Thickness (μm) | Fatigue Test | Fastening Property Test |
|---|---|---|---|---|
| Example 1 | $Fe_3O_4 + Fe_2SiO_4$ | 5 | ◯ | ◯ |
| Example 2 | $Fe_3O_4 + Fe_2SiO_4$ | 10 | ◯ | ◯ |
| Example 3 | $Fe_3O_4 + Fe_2SiO_4$ | 20 | ◯ | ◯ |
| Comparative Example 1 | $Fe_3O_4$ | 2 | ◯ | X |
| Comparative Example 2 | No Film Was Formed | — | ◯ | X |
| Comparative Example 3 | Only an $Fe_2O_3$ Film was formed | 22 | X | X |
| Comparative Example 4 | $Fe_3O_4 + Fe_2SiO_4 +$ Manganese Phosphate film | 8 | X | X |
| Comparative Example 5 | $Fe_3O_4 + Fe_2SiO_4 +$ Zinc Phosphate Film | 8 | X | X |
| Comparative Example 6 | Cr plating | 25 | X | X |
| Comparative Example 7 | $Fe_3O_4 + FeSiO_4$ | 24 | ◯ | X |
| Comparative Example 8 | $Fe_3O_4 + FeSiO_4$ | 30 | ◯ | X |

The results show that, in Examples 1 to 3 having an iron based oxide film with a film thickness of 3 μm or greater and 20 pin or less, fastening reliability was excellent because defects of the iron based oxide film due to fastening was prevented, and fatigue strength was excellent because tempering was sufficiently performed.

In the Comparative Examples 4 and 5 in which the phosphoric acid based film was formed on the iron based oxide film, the film easily came off and caused film defects. Comparative Examples 7 and 8 had a non-uniform iron based oxide film and had decreased fastening reliability.

The invention claimed is:

1. A bolt comprising:
    a base material; and
    an iron-containing oxide film disposed on the base material, wherein:
    the base material has a composition comprising:
        0.50 mass % or greater and 0.65 mass % or less of carbon (C),
        1.5 mass % or greater and 2.5 mass % or less of silicon (Si),
        1.0 mass % or greater and 2.0 mass % or less of chromium (Cr),
        0.2 mass % or greater and 1.0 mass % or less of manganese (Mn),
        1.5 mass % or greater and 5.0 mass % or less of molybdenum (Mo),
        wherein a total amount of a phosphorous (P) and a sulfur (S) as impurities is 0.03 mass % or less, a remaining is an iron (Fe),
    the iron-containing oxide film has a film thickness of 3 μm or greater and 20 μm or less,
    the iron-containing oxide film contains $Fe_3O_4$ and $Fe_2SiO_4$,
    the iron-containing oxide film contains the $Fe_3O_4$ in a greater amount on an outer side of the iron-containing oxide film than on an inner side of the iron-containing oxide film,
    the iron-containing oxide film contains the $Fe_2SiO_4$ in a greater amount on the inner side of the iron-containing oxide film than on the outer side of the iron-containing oxide film, and
    the $Fe_3O_4$ is formed at an outermost surface of the iron-containing oxide film.

2. The bolt according to claim 1, having a tensile strength of 1500 MPa or greater and 1800 MPa or less.

3. A fastened structure, comprising a fastened member fastened with the bolt according to claim 1.

* * * * *